US010186848B2

(12) United States Patent
Durand et al.

(10) Patent No.: US 10,186,848 B2
(45) Date of Patent: Jan. 22, 2019

(54) METHOD FOR INSTALLING A WIRING HARNESS IN AN AIRCRAFT AND TOOL FOR IMPLEMENTING SAID METHOD

(71) Applicant: Airbus Operations (SAS), Toulouse (FR)

(72) Inventors: Yves Durand, Aussonne (FR); Bernard Guering, Montrabe (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 1128 days.

(21) Appl. No.: 14/087,064

(22) Filed: Nov. 22, 2013

(65) Prior Publication Data
US 2014/0145128 A1 May 29, 2014

(30) Foreign Application Priority Data
Nov. 28, 2012 (FR) .................... 12 61343

(51) Int. Cl.
*H02G 1/06* (2006.01)
*H02G 1/00* (2006.01)

(52) U.S. Cl.
CPC ............ *H02G 1/06* (2013.01); *H02G 1/00* (2013.01)

(58) Field of Classification Search
CPC .... H02G 1/06; H02G 1/00; B66F 1/00; B66F 3/00; B66F 5/00; B66F 7/00
See application file for complete search history.

(56) References Cited

U.S. PATENT DOCUMENTS

| 1,120,982 | A | * | 12/1914 | Mitchell | ............... G09F 11/295 40/466 |
| 4,113,207 | A | * | 9/1978 | Dalziel | .................... B64D 1/22 182/137 |
| 4,367,852 | A | * | 1/1983 | Lazaro, Jr. | ............. B65H 67/00 242/129.72 |
| 2005/0098769 | A1 | * | 5/2005 | Raycraft | ............. E04F 21/1811 254/329 |
| 2010/0031509 | A1 | | 2/2010 | Frauen et al. | |

FOREIGN PATENT DOCUMENTS

| DE | 19519105 | | 11/1996 | |
| GB | 1120952 | A * | 7/1968 | ............... B64D 1/02 |
| WO | 2007057411 | | 5/2007 | |

OTHER PUBLICATIONS

French Search Report, dated Jul. 19, 2013.

* cited by examiner

*Primary Examiner* — David Bryant
*Assistant Examiner* — Nirvana Deonauth
(74) *Attorney, Agent, or Firm* — Greer, Burns & Crain, Ltd.

(57) ABSTRACT

A method for installing a wiring harness in an aircraft. The method comprises using cables having first ends secured to the harness and winding means onto each of which is wound one of said cables so as to lift up said harness by exerting a tensile force. The first ends of the cables are distributed along at least a section of the harness so as to distribute the tensile forces over the section.

16 Claims, 6 Drawing Sheets

METHOD FOR INSTALLING A WIRING HARNESS IN AN AIRCRAFT AND TOOL FOR IMPLEMENTING SAID METHOD

CROSS-REFERENCES TO RELATED APPLICATIONS

This application claims the benefit of the French patent application No. 12 61343 filed on Nov. 28, 2012, the entire disclosures of which are incorporated herein by way of reference.

BACKGROUND OF THE INVENTION

The present invention relates to a method for installing a wiring harness in an aircraft and to a tool for implementing said method.

An aircraft comprises many electric wires used in particular for transmitting electrical energy or information, commands or signals between various electrical elements of the aircraft.

For the remainder of the description, an electrical element is understood as an element connected to one or more electric wires, using the electrical energy transmitted by an electric wire and/or supplying electrical energy to an electric wire and/or able to receive and/or transmit information, a command or a signal carried by said electric wire. For example, an electrical element can be an actuator, a sensor, an electronic card, a calculator, a source of electrical energy, an electrical receiver or the like.

A wiring harness comprises a collection of electric wires which are gathered and connected to one another by connectors and/or clamping collars. Each electric wire of a harness comprises, at each end, a connection means for connecting it to another wire or to an electrical element. Each electric wire can have a specific connection means or one and the same connection means can be shared by several wires.

The electric wires of a harness can be of different lengths. Thus, several electric wires can form a subassembly forming one branch of the harness.

A wiring harness follows a specific path in the aircraft, depending on the electrical elements connected and on the path options left available by the other elements present in the aircraft.

According to one mode of installation, in an electrical and electronics (E&E) bay of an aircraft, some harnesses are fastened to crosspieces which support the floor separating the E&E bay from the cockpit or the cabin of the aircraft.

A first limitation is that, as a wiring harness has no intrinsic rigidity, it must be connected to the structure of the aircraft at regular intervals by means of fasteners such that it follows its path.

A second limitation is that a wiring harness can be tens of metres long. It is therefore bulky and can represent a large mass to be lifted up, of the order of one hundred kilograms.

According to one mode of operation, integrating a wiring harness involves unrolling the harness and then placing it in the correct position with respect to the path which it is to take. The harness must then be fastened at regular intervals to the structure of the aircraft and/or to the elements present in the aircraft; it must then be connected to the various electrical elements.

A third limitation is that these various operations must be performed most meticulously as a wiring harness is fragile and must never be bent during these various operations.

Given these limitations, integrating a wiring harness into an aircraft can require ten or so operators.

These various operators must be able to correctly manoeuvre the wiring harness even in areas which are crowded with numerous already-installed elements or items of equipment, as can be the case in an E&E bay.

The presence of numerous wiring harnesses in certain areas such as the E&E bay therefore makes it necessary to impose an additional limitation at the stage of designing and installing the various items of equipment of said areas. Thus, this limitation generally makes it necessary to leave relatively large accessible spaces so as to allow the harnesses to be installed.

However, this limitation goes against an important principle of aircraft design, specifically that of reducing the space taken up by technical elements so as to increase that available for areas of high profitability such as the passenger cabin or the baggage hold.

An aspect of the present invention proposes a method by which the installation of a wiring harness in an aircraft, even in a tight space, can be simplified.

SUMMARY OF THE INVENTION

According to the invention, the method for installing a wiring harness in an aircraft is characterized in that it comprises using cables having first ends secured to the harness and winding means onto each of which one of said cables is wound so as to lift up said harness by exerting a tensile force, the first ends of the cables being distributed along at least a section of the harness so as to distribute the tensile forces over said section.

Advantageously, the distribution of the winding means along the path is identical to the distributions of the first ends of the cables along the wiring harness. This configuration makes it possible to avoid bending the wiring harness.

It is preferable to exert tensile forces successively on the cables, according to a sequence following the order of installation of the winding means along the path, and to repeat this sequence until the wiring harness coincides with the path. This method makes it possible to obtain a progressive deformation of the harness and to limit the risk of damage.

Advantageously, the cables are wound up automatically so that the winding is stopped as soon as the tensile force exceeds a predetermined threshold.

The present application also relates to a tool for implementing the aforementioned method. According to the invention, the tool is characterized in that it comprises a plurality of winding means and a plurality of cables, wherein each cable comprises a first end which is secured to the harness and is wound onto a winding means, the first ends of the cables being distributed along the harness so as to distribute the tensile forces over the entire harness.

According to one variant, a winding means comprises a winder having a drum onto which a cable is wound. According to one embodiment, a winder is coupled to a motor, and it preferably comprises a controller by means of which the operation of the motor can be controlled.

Each winder advantageously comprises a means for measuring the tensile force applied to the cable.

According to another variant, a winding means comprises a first pulley onto which a cable is wound on a winding angle sector, said cable comprising a first strand connected to the harness and a second strand upon which a tensile force is to be exerted so as to lift up said harness. A winding means preferably comprises a second pulley for guiding the second strand such that the second strands converge. The second strand may be acted on manually or may be wound onto a winder, as the case may be.

The winding means are advantageously fastened to the structure of the aircraft in a dismantlable manner, and means for securing the first ends to the harness in a dismantlable manner are provided.

BRIEF DESCRIPTION OF THE DRAWINGS

Other features and advantages will emerge from the following purely exemplary description of the invention, with reference to the appended drawings, in which.

DETAILED DESCRIPTION OF THE PREFERRED EMBODIMENTS

Figure 2A:
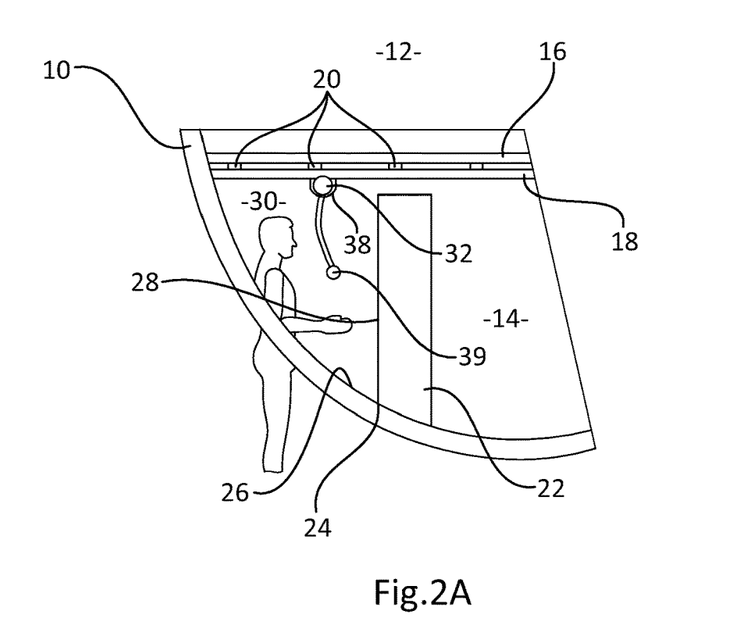
FIGS. 2A and 2B are diagrams illustrating a wiring harness in an aircraft respectively in the disconnected and the connected state.
Figure 2B:
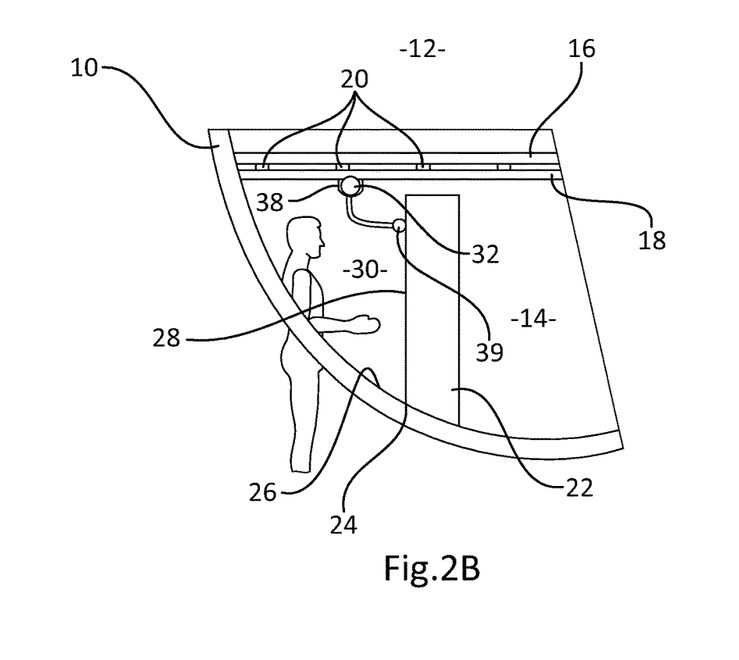

FIGS. 2A and 2B show, with the reference 10, an aircraft fuselage in cross section.

For the remainder of the description, the longitudinal direction corresponds to the direction extending from the nose of the aircraft to its tail. A transverse plane corresponds to a plane which is perpendicular to the longitudinal direction.

Inside the fuselage 10, at the plane of section of FIGS. 2A and 2B, the aircraft comprises in its upper portion a cabin 12 for passengers and in its lower portion an E&E bay 14 which is kept separate from the cabin 12 by a floor 16. As shown in FIGS. 1A to 1E, the floor 16 is supported by crosspieces 18 (extending in transverse planes) and spars 20 (extending in directions parallel to the longitudinal direction).

The E&E bay 14 contains a great many electrical and electronic elements, such as calculators and electrical master boxes. According to one mode of installation, as shown in FIGS. 2A and 2B, a unit 22 (or a row of units) runs in line with the fuselage 10. The base 24 of the unit 22 therefore comprises an edge which is clamped against the inner wall 26 of the fuselage. In this case, the rear face 28 of the unit 22, the inner wall 26 of the fuselage and the floor 16 delimit a tight space 30 inside which at least one wiring harness 32 is integrated.

When it is installed, the wiring harness 32 follows a path 34. The path 34 is shown by the dotted line in FIGS. 1A to 1E.

According to one integration example, the path 34 is substantially straight, oriented in the longitudinal direction and arranged just below the floor 16.

Figure 3:
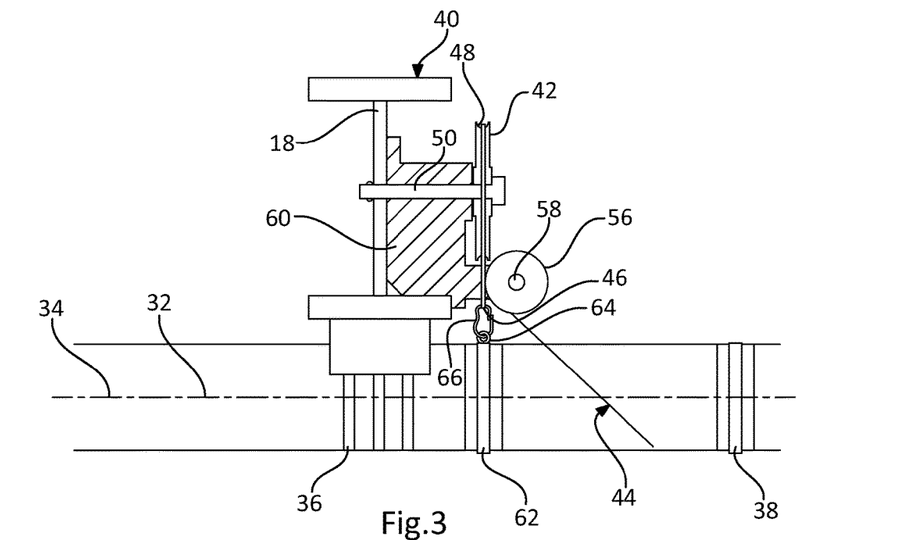
FIG. 3 is a view in section in a plane parallel to the wiring harness, schematically illustrating a tool by means of which a wiring harness can be installed in an aircraft according to a first variant of the invention.

Once installed, the wiring harness 32 is connected to the crosspieces 18 by means of fasteners 36, as shown in FIG. 3. The wiring harness 32 comprises electric wires which are held in bunches by collars 38.

The harness comprises ends and may be branched at one or more points. The end or ends of the wiring harness and the branches generally comprise connection means 39 (shown in FIG. 2B).

The wiring harness 32, its shapes, the fasteners 36 and the distribution thereof, the collars 38 and the distribution thereof, and the connection means 39 are not described in more detail as they are known to those skilled in the art.

Although it is described for integrating a wiring harness in a tight space of an E&E bay, the present invention is not restricted to this application and can apply to all spaces in the aircraft. Moreover, the invention can be used for the entire wiring harness or for at least one section of the wiring harness. It can be used to install a wiring harness which does not rest on the ground. Thus, the invention can be applied if the wiring harness is suspended from a ceiling or fastened along an inclined (non-horizontal) wall. The wiring harness is generally connected directly or indirectly to the structure of the aircraft 40. The wiring harness can thus be fastened to a support connected to the structure of the aircraft. In addition, the wiring harness 32 can be connected to one or more supports which are present in an aircraft.

The path 34 followed by the harness is not necessarily straight.

FIGS. 1A to 1E, 3 and 4 show a first variant of a tool by means of which a wiring harness 32 can be installed along a predefined path 34.

This tool comprises a plurality of pulleys 42 which are stationary with respect to the structure of the aircraft 40 and are distributed close to and along the path 34, as well as a plurality of cables 44, one for each pulley 42, each of these comprising one first end 46 connected to the wiring harness 32.

Figure 4:
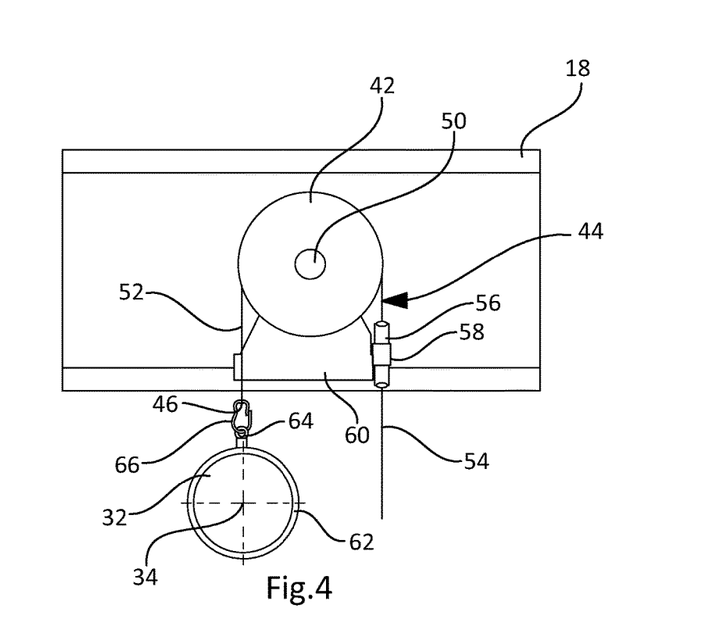
FIG. 4 is a view in section of the tool of FIG. 3 in a plane perpendicular to the wiring harness.

Each pulley 42 comprises a groove 48 which houses the corresponding cable 44 and a rotation spindle 50 which is secured to the structure of the aircraft 40. Each cable 44 is wound onto the pulley 42 on a winding angle sector, and passes above the rotation spindle 50. On either side of the winding angle sector, the cable 44 comprises a first strand 52 extending from the winding angle sector to the first end 46 connected to the wiring harness and a second strand 54 which can be actuated. The rotation spindle 50 of the pulley is arranged above the path 34 such that, when the second strand 54 is acted upon by a force having a downward component, the first strand 52 exerts a force having an upward component on the wiring harness.

In the remainder of the description, the direction parallel to the force corresponding to the weight of the wiring harness is considered to be the vertical direction. The horizontal direction is perpendicular to this vertical direction.

The upward orientation is in the opposite direction to the force corresponding to the weight of the wiring harness. The downward orientation is in the same direction as the force corresponding to the weight of the wiring harness.

According to one embodiment, the wrap winding sector corresponds approximately to the upper half of the pulley 42.

In order to improve the positioning of the wiring harness 32 with respect to the path 34, the rotation spindle 50 of the pulley 42 is advantageously parallel to the path 34, as shown in FIGS. 3 and 4.

The rotation spindle 50 of the pulley 42 is preferably offset in a transverse plane in the horizontal direction with respect to the path 34 such that that tangent to the groove 48 which is vertical and on the side of the first strand 52 passes through the path 34. This configuration improves the positioning of the wiring harness 32 with respect to the path 34.

According to another feature of the invention, the pulleys 42 are arranged along the path 34 with a distribution which is identical to that of the first ends 46 of the cables 44 along the wiring harness 32. This configuration makes it possible to avoid bending the wiring harness.

The number of cables and the distribution of their first ends 46 along the wiring harness are advantageously determined so as to distribute, in a substantially homogeneous manner, for taking up weight of the harness by all the cables 44.

The pulleys 42 are preferably distributed along the path 34 depending on the geometry of the path in order that the wiring harness 32 follows said path to the best possible extent. The curved regions of the path 34 therefore comprise at least one pulley 42.

The pulleys 42 are preferably installed along the path 34 with a regular spacing between them.

According to a first embodiment, the tool comprises a pulley 42 close to each fastener 36, as shown in FIGS. 1A to 1E and 5A.

In the case of a wiring harness connected to all the crosspieces 18 by fasteners 36, each crosspiece 18 supports a pulley 42.

According to another embodiment, the pulleys can be distributed with a wider or narrower regular spacing, or they can be distributed irregularly. According to one embodiment, shown in FIG. 5B, the tool comprises a pulley 42 on every other crosspiece.

Each pulley 42 provided for lifting up the wiring harness 32 is preferably associated with a second pulley 56 provided for guiding the second strand 54. Each second pulley 56 preferably has a rotation spindle 58 which is perpendicular to the rotation spindle 50 of the first pulley 42. Advantageously, the second pulley 56 is arranged in a vertical plane tangential to the groove 48 of the first pulley 42 on the side of the second strand 54.

By means of the second pulleys 56, the second strands 54 can be made to converge, for example towards an operator as shown in FIGS. 1A to 1E.

According to one embodiment shown in FIGS. 3 and 4, each pair of pulleys 42 and 56 is mounted on a support 60 which is itself fastened to the structure of the aircraft 40, and more particularly on a crosspiece 18.

According to one embodiment, the support 60 is fastened to the structure of the aircraft 40 in a dismantlable manner, such that it can be removed after installing the wiring harness. This configuration makes it possible to avoid an increase in the on-board mass.

According to one embodiment shown in FIG. 3, the first end 46 of each cable 44 is connected to the wiring harness via the intermediary of a collar 62. The collars 62 are preferably designed to remain on the wiring harness. The collars 38 used for keeping the wires of the wiring harness bunched together can be used as collars 62 so as to provide the connection with the cables 44. Advantageously, each collar 62 comprises an eye 64 and the first end 46 of each cable 44 comprises a carabiner 66 for securing it to the eye 64 quickly and in a dismantlable manner. Other technical solutions could be conceived for securing the first end of each cable to the wiring harness quickly and in a dismantlable manner.

Figure 1A:
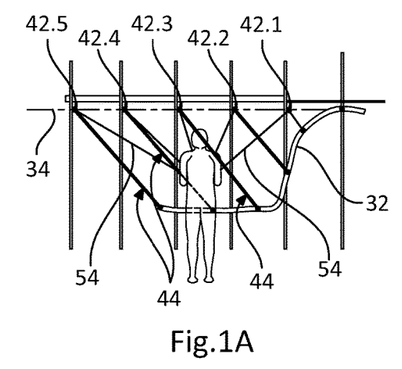
FIGS. 1A to 1E are diagrams illustrating steps of a method for installing a wiring harness in an aircraft using a tool according to a first variant of the invention.

According to one mode of operation illustrated in FIGS. 1A to 1E, the wiring harness 32 is unrolled and pre-positioned on the ground at the start of the space as shown in FIG. 1A. A portion of the harness can already be fastened.

In a first instance, once the tool is installed on the structure of the aeroplane 40, the first ends 46 of the cables 44 are secured to the wiring harness 32.

The operator pulls successively and progressively on the second strands 54 of the cables.

For the remainder of the description, as shown in FIGS. 1A to 1E, the first pulleys are referenced 42.1 to 42.5 following the order of installation along the path 54, starting from the pulley closest to the harness.

Figure 1B:
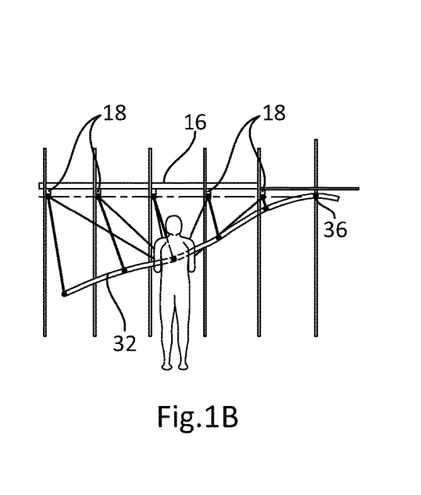
Figure 1C:
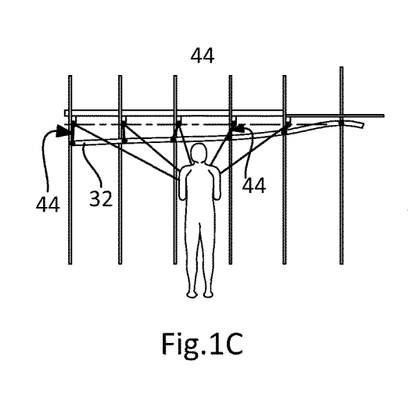

According to one mode of operation, the operator pulls on the second strand 54.1 of the pulley 42.1 closest to the harness, exerting a certain tension. The operator then pulls on the second strand 54.2 of the pulley 42.2, exerting substantially the same tension as on the first. This is continued as far as the last pulley 42.5. The operator repeats this sequence, starting from the first pulley 42.1 and continuing to the last pulley 42.5, as many times as is necessary, as shown in FIG. 1B, until the wiring harness coincides with the path 34 close to the first pulley 42.1 as shown in FIG. 1C.

Figure 1D:
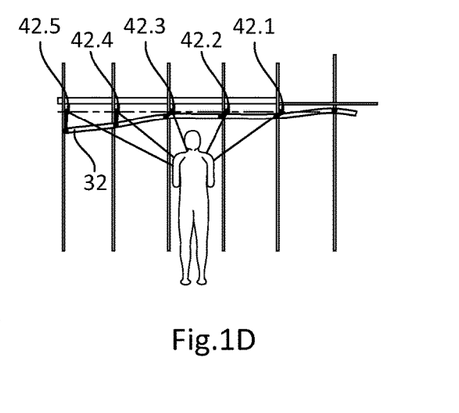
Figure 1E:
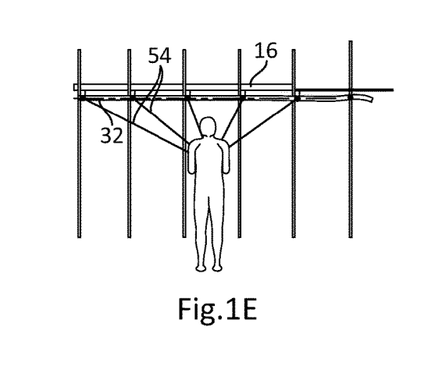

At this point, the operator may secure the wiring harness using a fastener 36 close to the pulley 42.1. The operator now no longer needs to act on the second strand 54.1 and continues to pull on the remaining second strands 54.2 to 54.5 in a successive and progressive manner. The wiring harness gradually comes to coincide with the path 34 over a greater length. The fasteners 36 are put in place as and when the harness coincides with the path. As shown in FIG. 1D, the wiring harness 32 coincides with the path 34 as far as the pulley 42.3. The operator now acts only on the strands 54.4 and 54.5 until the harness coincides with the path over its entire length. As shown in FIG. 1E, all the fasteners 36 are put in place. At this point, the ends of the harness or the ends of the branches hang down as shown in FIG. 2A.

The operator can then connect the wiring harness 32 with the electrical element or elements, as shown in FIG. 2B.

The cables 44 are then removed from the wiring harness 32 and the tool is dismantled.

According to the method of the invention, the actions on the various strands must be as progressive as possible so as to distribute the tensile forces over the entire harness. Dividing the forces over the plurality of cables thus means that the harness is subjected to reduced loads at multiple points, making it possible to reduce the risk of damage.

According to this variant, the forces applied to the second strands 54 are generated manually by an operator.

As a variant, the free end of each second strand 54 can be wound onto a winder, one for each strand, which manages the winding of the corresponding second strand.

Each winder comprises a drum onto which the cable is wound. The drum is preferably rotated mechanically, for example by means of a spring or by coupling the drum to a motor.

Each winder can comprise a means for measuring the tensile force applied to the second strand which controls the winding of said second strand when the tensile force is below a first predetermined threshold, and which orders the winding to be stopped when the tensile force exceeds a second predetermined threshold.

This variant makes it possible to automate the action on the cables and to parameterize the tensile forces which are thus no longer dependent on the judgement of the operator.

As previously, the winders control the winding of the cables successively from one cable to another, starting from a first end and continuing to the other end, repeating this sequence until the harness coincides with the path.

The tool advantageously comprises means for preventing the wiring harness coming into contact with the winder or the floor and for limiting the risk of damage to the harness. According to one embodiment, the carabiner 66 can be used to this end: when it comes into contact with the winder, the tensile force increases significantly and exceeds the second predetermined threshold, leading to the winding being stopped. Other means, such as a visual control or a cable length calculation can be used to stop the winding before the harness hits the winder or the floor.

According to another variant illustrated in FIGS. 6 to 9, each pulley 42 can be replaced by a winder 68. According to this variant, the tool comprises a plurality of winders 68 arranged along the path 34 and each cable 44 comprises just a single strand, a first end 46 of which is connected to the harness and the other end of which winds onto the winder 68.

Advantageously, according to this variant, the winders 68 are arranged on the floor 16 (and not below it as is the case for the pulleys 42 of the preceding variants) and openings 70 (one for each cable 44) are provided in the floor 16, each allowing one cable to pass through.

According to this variant, each winder 68 comprises a drum onto which the cable is wound. The drum is preferably rotated mechanically, for example by means of a spring or by coupling the drum to a motor 72.

Advantageously, when the drum is coupled to a motor 72, each winder 68 comprises a controller 74 by means of which the operation of the motor can be controlled.

Each controller 74 is preferably controlled remotely by means of a wired or wireless connection.

According to one embodiment, the controllers 74 are controlled remotely by an operator by means of a remote control.

According to one embodiment, each winder 68 comprises a means for measuring the tensile force applied to the cable 44 which informs the controller 74 which triggers the winding of said cable when the tensile force is below a first predetermined threshold, and which stops the winding of the cable when the tensile force exceeds a second predetermined threshold.

According to another embodiment, the controllers 74 can be controlled by a control system 76. This control system 76 can comprise means (radar or the like) for determining the actual position of the harness during its installation and morphing software by means of which the next position that the winders 68 will impose on the harness is determined depending on the actual position of the harness.

Whatever the variant of the invention, the tool comprises a plurality of winding means (winders and/or pulleys) and a plurality of cables 44, each cable comprising a first end 46 secured to the harness and winding onto a winding means 42, 68, the first ends 46 of the cables 44 being distributed along at least one section of the harness so as to distribute the tensile forces over said section.

The winding means are preferably secured in a dismantlable manner to the structure of the aircraft and/or to one or more supports.

The variant having the winders provides automated management of the movement of the harness and improved management of the tensile forces exerted all along the harness. Moreover, this variant is simpler to use, in particular due to the fact that the tool is easier to assemble and dismantle as it is located in a more accessible space.

As a variant, at least one winding means comprises a means for stepping down the tensile force, for example a hoist system.

Figure 5A:
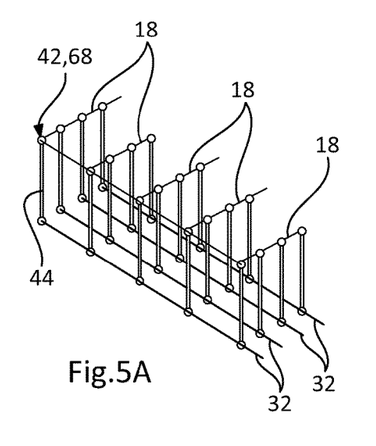
FIGS. 5A to 5D are diagrams illustrating various tools for installing multiple wiring harnesses in an aircraft.
Figure 5B:
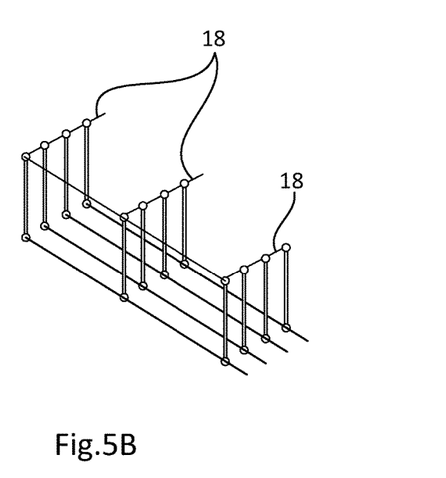
Figure 9:
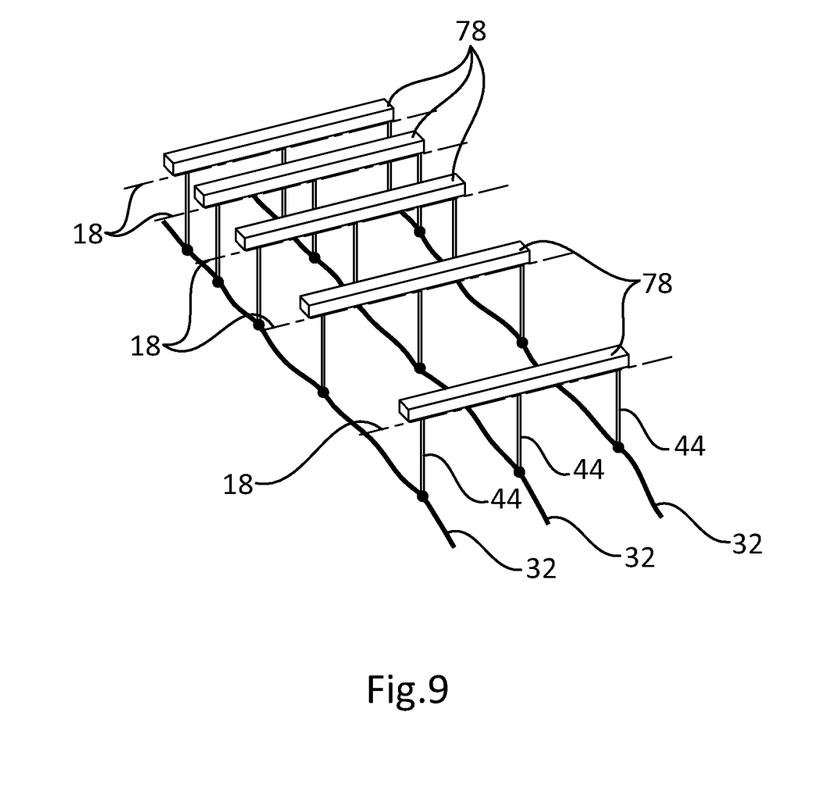
FIG. 9 is a schematic representation illustrating the installation of several wiring harnesses using tools as described in FIGS. 7 and 8.

According to a first solution, the movement of each harness is controlled by dedicated pulleys and winders, as shown in FIGS. 5A, 5B and 9.

According to a variant illustrated in FIG. 5A, pulleys and winders are provided on each crosspiece. According to other solutions shown in FIGS. 5B and 9, the spacing between the pulleys or the winders is different to the spacing between the crosspieces. Some crosspieces are thus not equipped with pulleys or winders.

In the case of the variant having winders 68, the winders 68 provided in line with one and the same crosspiece can be integrated into a block 78 (see FIGS. 7 and 9) which can be fastened in a dismantlable manner to the floor 16.

Figure 5C:
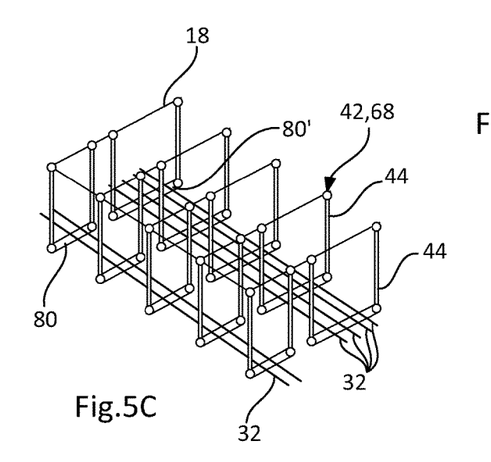
Figure 5D:
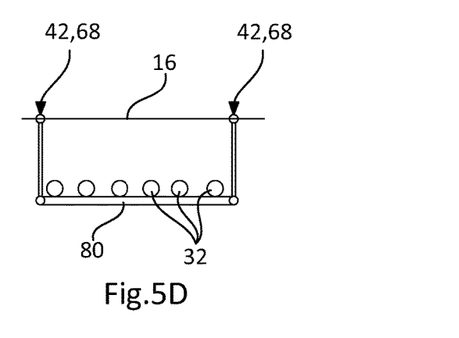
Figure 6:
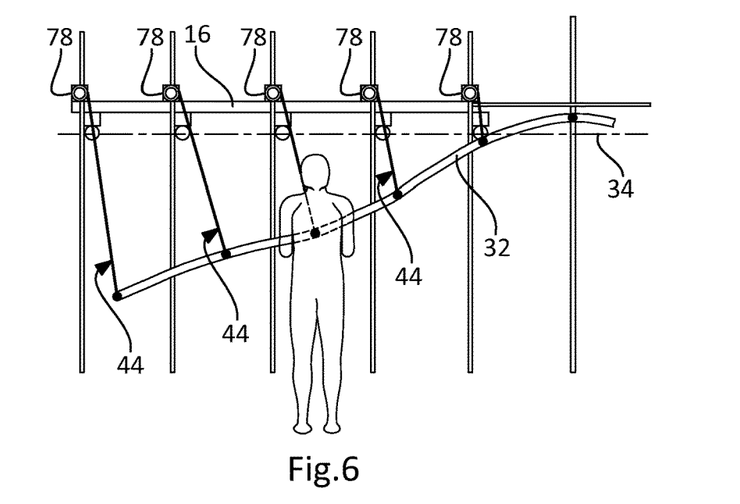
FIG. 6 is a diagram illustrating a step of installing a wiring harness in an aircraft using a tool according to a second variant of the invention.
Figure 7:
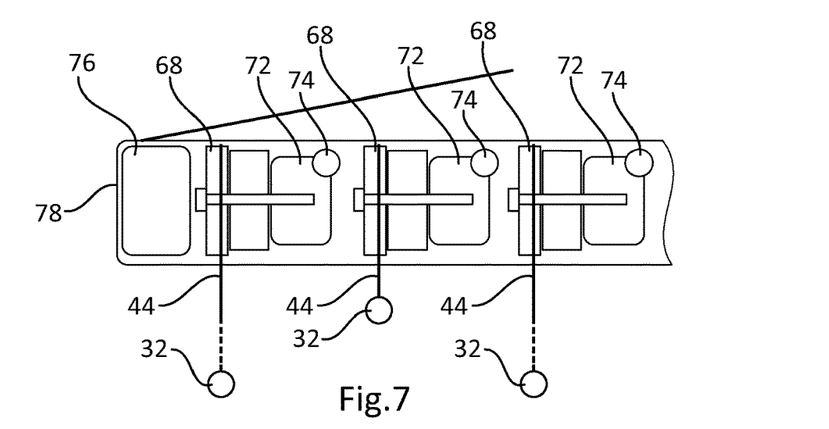
FIG. 7 is a view in section in a plane perpendicular to the wiring harnesses, schematically illustrating a tool by means of which wiring harnesses can be installed in an aircraft according to a second variant of the invention.
Figure 8:
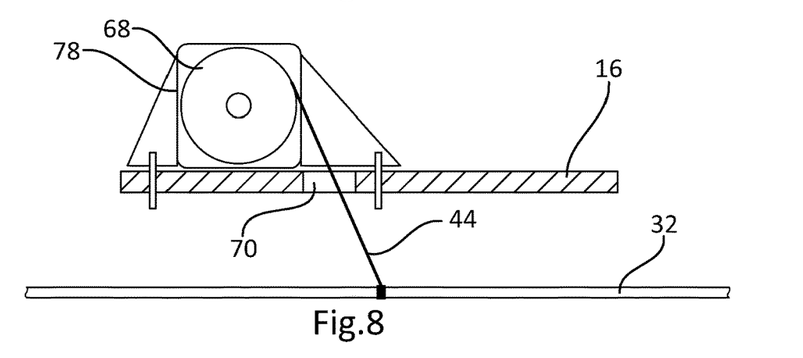
FIG. 8 is a view in section of the tool of FIG. 7 in a plane parallel to the wiring harnesses.

According to other solutions shown in FIGS. 5C and 5D, the cables 44 are not connected directly to the harnesses. According to one solution which is not shown, the cable 44 can form a loop through which pass one or more harnesses.

According to one solution, the ends 46 of two cables arranged in a transverse plane are connected by a rigid bar 80 upon which rest one or more wiring harnesses 32. The movements of the two cables are synchronised such that the rigid bar 80 is raised substantially horizontally.

According to one embodiment illustrated in FIG. 5D, in a transverse plane, all the harnesses are supported by the same bar 80. According to one embodiment illustrated in FIG. 5C, in a transverse plane, one or more harnesses are supported by a first bar 80 and one or more harnesses are supported by a second bar 80'. The number of rigid bars in one and the same transverse plane can vary and is not limited to two, and depends essentially on the weight of the harnesses.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for installing an electrical wiring harness in an aircraft, said electrical harness being fastened inside the aircraft so as to follow a path, said method comprising:
   lifting up said electrical harness, which comprises a plurality of electrical wires, and attaching the electrical harness inside the aircraft when the electrical harness coincides with said path,
   using a plurality of cables, each having a first end secured to the electrical harness such that the first ends are attached along a length of the electrical harness and a plurality of winding means onto each of which one of said plurality of cables is wound so as to lift up said length of the electrical harness by exerting a tensile force, and
   distributing the first ends of the cables along at least a section of the electrical harness so as to distribute the tensile forces over said section.

2. The method for installing an electrical wiring harness in an aircraft according to claim 1, including distributing of the winding means along the path which is identical to the distributing of the first ends of the cables along the electrical wiring harness.

3. The method for installing an electrical wiring harness in an aircraft according to claim 1, further comprising exerting tensile forces successively on the cables using the plurality of winding means, according to a sequence corresponding to an order of installation of the winding means along the path, and repeating this sequence until the electrical wiring harness coincides with the path.

4. The method for installing an electrical wiring harness in an aircraft according to claim 1, further comprising dismantling the winding means and removing the cables from the electrical wiring harness once the electrical wiring harness is fastened.

5. A tool designed for installing a wiring harness in an aircraft, wherein said harness must be fastened in the aircraft so as to follow a path, comprising:
   a plurality of winding means and a plurality of cables,
   each cable comprising a first end which is secured to the harness, which comprises a plurality of wires, and is wound onto one of the winding means,
   the first ends of the cables being distributed along a length of the harness so as to distribute the tensile forces over said length,
   wherein the winding means comprises a plurality of pulleys, each pulley having an axis of rotation parallel to the path of the harness.

6. The tool according to claim 5, wherein the winding means comprises a winder having a drum onto which a cable is wound.

7. The tool according to claim 6, further comprising the winder being coupled to a motor.

8. The tool according to claim 7, wherein the winder comprises a controller by means of which the operation of the motor is controlled.

9. The tool according to claim 8, further comprising a control system for controlling the controllers.

10. The tool according to claim 9, wherein the control system comprises means for determining an actual position of the harness during installation of the harness and software by means of which the actual position of the harness can be used to determine a next subsequent position.

11. The tool according to claim 6, wherein each winder comprises a means for measuring the tensile force applied to the cable.

12. The tool according to claim 5, wherein a winding means comprises a first pulley onto which a cable of the plurality of cables is wound on a winding angle sector, said cable of the plurality of cables comprising a first strand connected to the harness and a second strand upon which a tensile force is to be exerted so as to lift up said harness.

13. The tool according to claim 12, wherein the winding means comprises a second pulley for guiding the second strand such that the second strands converge.

14. The tool according to claim 5, wherein the winding means are fastened to a structure of the aircraft in a dismantlable manner.

15. The tool according to claim 5, further comprising means for securing the first ends to the harness in a dismantlable manner.

16. A tool designed for installing a wiring harness in an aircraft, wherein said harness must be fastened in the aircraft so as to follow a path, comprising:
   a wiring harness comprising a plurality of electrical wires to be attached inside the aircraft;
   a plurality of winding means and a plurality of cables,
   each cable comprising a first end which is secured to the wiring harness, which comprises a plurality of wires, and is wound onto one of the winding means,
   the first ends of the cables being distributed along a length of the harness so as to distribute the tensile forces over said length,
   wherein the winding means comprises a plurality of pulleys, each pulley having an axis of rotation parallel to the path of the wiring harness.

* * * * *